No. 798,815. PATENTED SEPT. 5, 1905.
H. P. MAXIM.
TIRE FOR VEHICLES.
APPLICATION FILED AUG. 22, 1903.
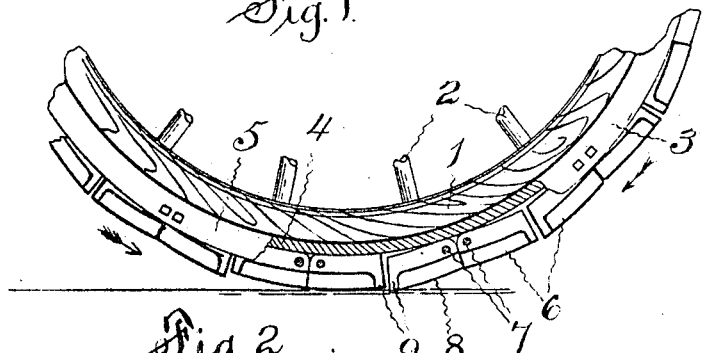
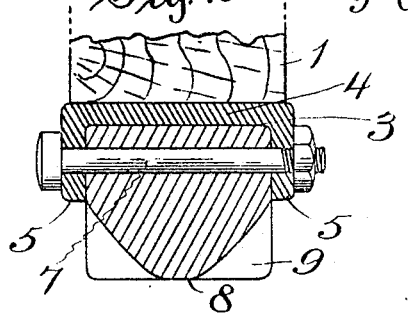
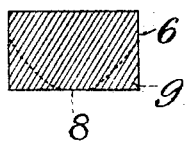
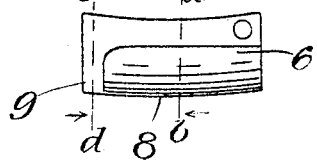
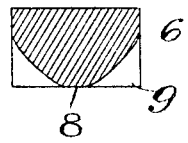
Witnesses
Emma P. Coffin
Lena O. Smith
Inventor
Hiram Percy Maxim
By Jenkins & Backer
Attorneys

UNITED STATES PATENT OFFICE.

HIRAM PERCY MAXIM, OF PITTSBURG, PENNSYLVANIA.

TIRE FOR VEHICLES.

No. 798,815.           Specification of Letters Patent.           Patented Sept. 5, 1905.

Application filed August 22, 1903. Serial No. 170,422.

*To all whom it may concern:*

Be it known that I, HIRAM PERCY MAXIM, a citizen of the United States, and a resident of Pittsburg, in the county of Allegheny and State of Pennsylvania, have invented certain new and useful Improvements in Tires for Vehicles, of which the following is a specification.

The invention relates to tires for vehicles, and more particularly to a tire for use upon self-propelled vehicles, where the greatest possible amount of traction must be secured in order to drive the vehicle without slip of the wheels either in forward driving or in a direction transverse to the forward driving movement of the wheels.

It more specifically relates to a particular class of tires which are provided with means for absolutely preventing the slip of the wheels and to increase the traction to the maximum so that the vehicle will run smoothly and yet may be run with security upon surfaces either hard or soft and even upon icy or snow-covered surfaces.

The objects of the invention are to provide an extremely cheap form of tire of simple construction and one which will be of long life and have excellent wearing qualities.

A further object is to provide a tire with a smooth-running tread and gripping-surfaces which will preclude slip of the tire both in driving the vehicle and to prevent side slip of the wheels.

A further object is to produce a tire which will cut through snow or ice and find a solid surface to run upon without rolling down snow, sand, or other soft substances in such manner as to cause an increased power consumption of the vehicle.

Referring to the drawings, Figure 1 denotes a small portion of a wheel, illustrating one form of the invention. Fig. 2 is a cross-sectional view of the felly and improved tire through the pivoted end of one of the shoes. Fig. 3 is a side view of one of the shoes shown in Figs. 1 and 2. Fig. 4 is a cross-section of the shoe on the line $a\,b$ of Fig. 3. Fig. 5 is a cross-section of the line $c\,d$ of Fig. 3.

It has long been the practice in tire construction for self-propelled vehicles to use rubber, leather, or other fibrous material having a certain amount of cohesion when brought into contact with a driving-surface, such as a roadway; but it has been found that in vehicles of the class which are used for carrying heavy merchandise rubber and like tires are practically prohibited for ordinary service—first, on account of their great cost and rapid depreciation in service, and, secondly, because they do not provide the proper driving effect and sufficient traction under conditions existing at various seasons. It will therefore be seen that to make the motor-propelled vehicle thoroughly practical it becomes necessary to provide a tire cheap in construction, having very long wearing qualities, and one which will exert the greatest amount of traction on an ordinary roadway under every existing condition—for instance, both in summer and in winter.

Of course there are certain essentials which a tire must possess. It must be formed to roll smoothly on the hardest pavement where there may be no tendency even for a smooth iron tire to slip. It must immediately grip a surface upon running onto it whether the surface be hard or smooth and where slipping of the tire would be most liable. The arrangement must be such that this non-slipping effect will be an inherent quality of the tire and needs no manipulation on the part of the driver of the vehicle. The tire must grip at all time both when driving in a forward or reverse direction. It should also be provided with means for effecting as great a side traction as possible to avoid side slipping of the wheels. It must also be arranged to part snow, sand, or other smooth substances which lie more or less deep and find a hard surface to grip and run upon. It should not roll down a broad surface of smooth material, as this increases the power consumption enormously for the reason that the wheels are, in effect, constantly trying to climb a hill. It requires comparatively little power to part smooth substances, as sand or snow, although they may be of a considerable depth, and by parting the substance the hill-climbing effect is avoided, as obviously a hard bottom will be uncovered upon which the wheels will easily roll.

The tire herein shown and described embodies so far as possible all of the above essentials, and, further, it may be applied to any well-known form of wheel in common use.

The tire consists, essentially, of an ordinary binding-tire surrounding the felly of a wheel and provided on its working face with gripping-surfaces and a smooth tread portion.

In the drawings herein there is shown one manner of carrying out the invention to secure the desired results.

In the drawings, the numeral 1 denotes the felly of a wheel having ordinary spokes 2, and of course the parts generally making up a complete wheel, which it is not deemed necessary to fully illustrate herein. Upon the felly 1 is mounted a channel 3, having a base 4, closely fitting the felly, as would an ordinary flat iron tire, while side parts 5 project outwardly and form a recess from which the tread portion of the tire projects. As shown in the drawings, the tread portion is composed of a series of shoes 6, pivotally secured at one end by bolts 7 to the outwardly-projecting portions of the channel and having a smooth tread portion 8, extending completely around the tire and of a form concentric, or substantially so, with the axis of the wheel. At intervals about the tire are cross-bars 9, which, in effect, intersect the smooth tread portion 8 and form a grip for the tire when in use.

Where the independent pivoted shoes are employed, the pivoted ends are preferably arranged adjacent to each other in two succeeding sections, whereby the increased hold is effective both in forward and backward driving of the wheel. It is apparent that with the form of tire shown in Figs. 1 to 5 the shoes in operation will always drop down a little at one end, as shown, and provide practically a chisel-face of considerable width for securing an absolute grip upon the pavement. On the other hand, the tread portion 8 being of substantially tapered form from its outermost point to the base of the shoe provides a surface which will part snow, sand, or other accumulated substances upon a roadway and preclude the hill-climbing effect of an ordinary flat tire.

Obviously various forms of the device might be used without departing from the spirit, intent, and scope of the invention, and the shoes may be made of various forms as to tread and transverse gripping members and may be pivoted or otherwise movably secured in various manners.

It is also of course immaterial whether the tire be made of steel or iron or some other metallic substance or of a fibrous material or a combination of metal and fibrous material, and, in fact, rubber might be employed.

What I claim as my invention, and desire to secure by Letters Patent, is—

1. A tire for vehicles comprising a retainer, a plurality of movable shoes operatively arranged with relation to said retainer, said shoes in use providing a substantially smooth tread-surface and having transverse gripping members.

2. A tire for vehicles comprising a retainer, a plurality of shoes pivotally supported with relation thereto and having a comparatively smooth tread-surface and transverse gripping members adapted to form a positive grip between the tire and the surface upon which it is rolled.

3. A tire for vehicles comprising a retainer, a plurality of shoes pivotally secured thereto and arranged in pairs with the pivots of adjacent shoes adjacent to each other, transverse gripping members upon the shoes arranged to form a positive grip between the tire and the surface upon which it is rolled in either direction of its rotation.

4. A tire for vehicles comprising a plurality of sections pivotally mounted with relation to the felly of a wheel and arranged in pairs the adjacent ends of each pair of members being pivoted, each of the members having a tread portion substantially concentric with the axis of the wheel and sloping from the tread upward, and transverse gripping members arranged upon each of the members at the opposite end from the pivots of said members.

5. A tire for vehicles comprising a plurality of sections loosely mounted with relation to the felly of a wheel and arranged in pairs, the adjacent ends of each pair of members being pivotally supported, each of the members having a tread portion substantially concentric with the axis of the wheel in operation and provided with transverse gripping members extending from both sides of the tread portion.

6. A tire for vehicles comprising a retainer, a plurality of movable shoes operatively mounted to move with relation thereto and provided with a smooth running tread-surface, each of said shoes having a gripping member equal in height to the tread portion and adapted to form a positive grip between the tire and the surface upon which it is rolled.

7. A tire for vehicles comprising a retainer, a plurality of movable shoes mounted and having a smooth tread-surface, said tread-surface providing a gripping means for preventing side slip during rotation of the tire, and transverse gripping members equal in height to the tread-surface and arranged to provide a positive grip between the tire and the surface upon which it is rolled.

HIRAM PERCY MAXIM

Witnesses:
WM. H. BARKER,
E. P. COFFRIN.